(12) United States Patent
Guerrera et al.

(10) Patent No.: US 7,895,579 B2
(45) Date of Patent: Feb. 22, 2011

(54) AUTOMATED METHOD AND SYSTEM FOR COLLECTING AND REPORTING API PERFORMANCE PROFILES

(75) Inventors: Nicholas Guerrera, Redmond, WA (US); Rico Mariani, Redmond, WA (US); Michael C. Fanning, Redmond, WA (US); Jan Stephen Gray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1286 days.

(21) Appl. No.: 11/454,714

(22) Filed: Jun. 16, 2006

(65) Prior Publication Data

US 2007/0294673 A1 Dec. 20, 2007

(51) Int. Cl.
*G06F 9/44* (2006.01)
(52) U.S. Cl. .................................... 717/125; 717/127
(58) Field of Classification Search .......... 717/124–135
See application file for complete search history.

(56) References Cited

U.S. PATENT DOCUMENTS

| | | | |
|---|---|---|---|
| 5,615,323 | A | 3/1997 | Engel et al. |
| 5,732,273 | A | 3/1998 | Srivastava et al. |
| 5,748,878 | A | 5/1998 | Rees et al. |
| 5,920,719 | A | 7/1999 | Sutton et al. |
| 2002/0080181 | A1 | 6/2002 | Razdow et al. |
| 2003/0192036 | A1 | 10/2003 | Karkare et al. |
| 2004/0230763 | A1 | 11/2004 | Cohen et al. |
| 2005/0071611 | A1* | 3/2005 | DeWitt et al. ............... 712/227 |
| 2005/0138111 | A1 | 6/2005 | Aton et al. |

FOREIGN PATENT DOCUMENTS

| | | |
|---|---|---|
| EP | 1308844 | 5/2003 |
| WO | 01/88701 | 11/2001 |

OTHER PUBLICATIONS

Shende et al., "A Performance Interface for Component-Based Applications", 2003, IEEE, 8 pages.*
Friedman et al., "Windows 2000 Performance Guide", 2002, Safari Books Online, sec. 2.2, pp. 1-24.*
Joukov, N. et al., "Fsprof: An in-kernel file system operations profiler," Tech. Rep. FSL-04-06, [Online] 2004, pp. 1-12, XP002545707, Computer Science Department, Stony Brook University Retrieved from the Internet: URL:www.fsl.cs.sunysb.edu/docs/aggregate_stats-tr/aggregate_stats.pdf> [retrieved on Sep. 14, 2009].
Joukov, N. et al., "Versatile, portable, and efficient OS profiling via latency analysis," SOSP '05: Proceedings of the Twentieth ACM Symposium on Operating Systems Principles, [Online] 2005, pp. 1-14, XP002545708 ACM, New York, USA ISBN: 1-59593-079-5 Retrieved from the Internet: URL:http://doi.acm.org/10.1145/1095810.1118607 [retrieved on Sep. 14, 2009].

* cited by examiner

*Primary Examiner*—Ted T Vo
(74) *Attorney, Agent, or Firm*—Woodcock Washburn LLP

(57) ABSTRACT

A method to measure the performance of an Application Programming Interface (API) includes selecting a target API and tracking memory allocation for the functional calls of the selected API to generate a list of functions called by the API. The individual functions are then called within the API in isolation and timing and memory allocation data for each are collected and recorded. The recorded results are then bucketized according to a log base 2 method and made accessible by API users to indicate the performance of specific APIs.

19 Claims, 4 Drawing Sheets

AUTOMATED METHOD AND SYSTEM FOR COLLECTING AND REPORTING API PERFORMANCE PROFILES

BACKGROUND

Unlike other engineering disciplines, software engineers have little in the way of quantitative information that they can consult when making design decisions. There are no omnibus catalogs of Application Programming Interface (API) performance costs. In this instance, the term "API" refers to a single function as in "The InvalidateRect API" rather than a family of functions as in "The Windows® Operating System API" available from Microsoft® Corporation in Redmond, Wash.

Additionally the situation is complicated by the fact that most APIs cannot have their cost characterized by a single number. Cost can be measured in many different ways—such as memory usage, CPU usage, I/O, costs and so forth and it can be dependent on input parameters as well as context and of course available hardware. As a result there is generally no attempt made to characterize the performance of APIs at all. This leaves engineers in the unfortunate position of having no a priori guidance available when making design decisions. They must resort to prototyping or worse yet, simply guessing, ignoring cost considerations entirely, or just hoping for the best. These latter options are all too common. Thus, the collection of API data is very desirable to provide useful knowledge of API performance or resources costs.

It is therefore desirable to gather highly accurate memory allocation and execution time data for API operation. One objective may be to provide the data to API consumers such that they can make informed decisions about whether the particular API components have memory and timing characteristics that are reasonable for their intended use. Since both allocation and timing will vary depending upon how the functions are used, the data preferably may reflect the statistical distribution of allocation and timing across a broad range of real-world scenarios. This distribution can constitute a 'performance profile' which may be used both to troubleshoot an API's behavior as well as to document these characteristics to consumers.

Although memory allocation may be measured with nearly 100% accuracy, measuring execution time is fraught with uncertainty. The measurement itself takes up a portion of the overall execution time which then distorts the data. This is particularly true when gathering the timing characteristics of a set of interdependent functions in a single profiling run. The measurement overhead for function calls deeper in the call tree will accumulate and alter the results for functions higher in the call tree. For example, if function A calls function B thousands of times in a tight loop and we are measuring the timing of A and B in the same run, then the cumulative measurement cost for B could dramatically alter the results for A. Existing tools attempt to address the issue by subtracting away the cumulative measurement error, but this approach fails to yield statistically significant results.

Generally, existing API measurement methods are used in the context of profiling tools which can record detailed cost information about a particular execution. These systems however are not suitable for omnibus data gathering because the act of measuring itself perturbs the cost. They are designed to harvest as much information about the whole program as possible in a single run. It is desirable to gather information about particular APIs over a variety of executions. The present invention addresses these and other concerns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method to measure the performance of an Application Programming Interface (API) includes selecting a target API and tracking memory allocation for the functional calls of the selected API in order to generate a list of functions called by the API. The individual functions are then called in isolation in order to measure timing and memory allocation data. The recorded results are then bucketized according to a log base 2 method and made accessible by API users to indicate the performance of specific APIs.

In another embodiment, a distributed method of collection of performance information of randomly selected APIs resident on users machines is made possible by a profiler system. The profiler system is distributed to willing users and measures API performance of applications on the users' computers on a non-interference basis. The collected data is forwarded to a central storage service where the API information is collected and organized into buckets of information representing the performance of a multitude of APIs. The information is made available to typical API users such as software developers.

DETAILED DESCRIPTION

Exemplatory Embodiments

API Performance Profiler

In one embodiment, an automated method and system for collecting and reporting an API performance profile is provided. The embodiment focuses on collecting highly accurate, empiric observations of executing code in order to generate a performance profile or fingerprint which can be used by developers or tools in order to assist in developing applications. The automated method employs the use of a specialized performance profiler, an automated system that exhaustively exercises binaries in order to generate data for all publicly visible entry points, a mechanism for persisting this data in a form that can be consumed by analysis tools, and a system for rendering profiles graphically, to assist in understanding function performance characteristics. In one mode, the profiler collects precise time-to-execute information for a visible API. In another, the profiler collects details regarding memory allocations that occur on calling any function.

Figure 1:
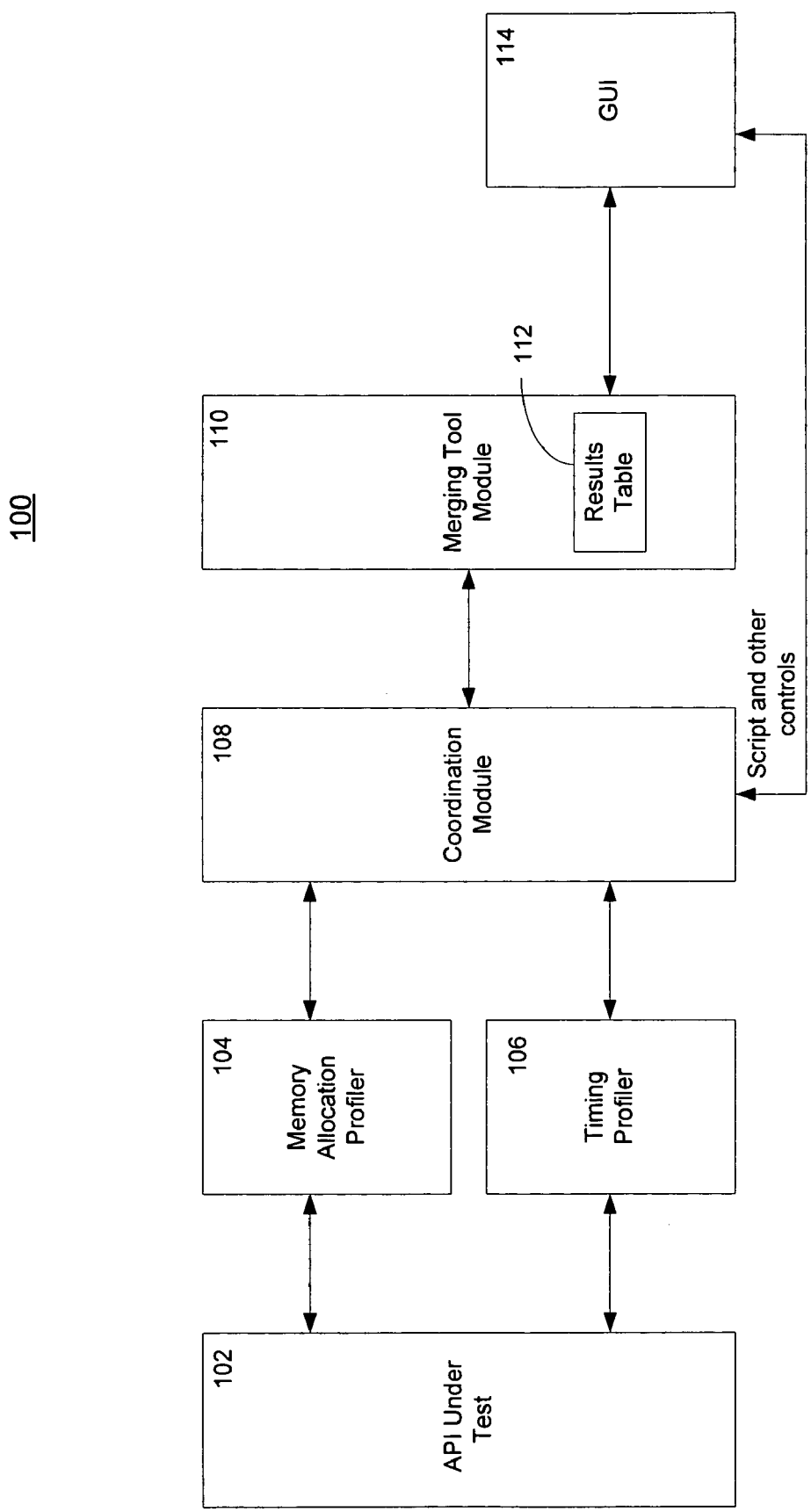
FIG. 1 is a block diagram showing an example software architecture of an API profiler system.

FIG. 1 depicts an example software architecture 100 for an API profiler which may be run on a computing platform to measure API performance. One such system is the Microsoft® CLR™ implementation of the ECMA 335 standard for the common language infrastructure. The API under test 102 generally exhibits in-situ characteristics that may be instrumented for observation and recording. A memory allocation profiler 104, which may be compatible with a CLR™, runs a given API performance scenario and records the count of the number of times a function call to that method resulted in a discrete value for log base 2 of the number of bytes that were allocated. The memory allocation profiler separately measures and records inclusive and exclusive allocation values. An inclusive memory allocation value is the number of bytes allocated by the function including all of the memory allocated by functions it called. An exclusive memory allocation value is the number of bytes allocated in blocks of code that are part of the function itself.

A timing profiler 106 may also be compatible with a CLR™ and hooks itself to the Just in Time (JIT) compilation of methods specified as additional input. This is done in such a way that the only additional overhead during the run will be for calls to the specific methods under investigation and there is no overhead for calls to other methods. The timing profiler also measures and records timing information related to the API under test 102.

A coordination module 108 takes a script to run a given managed code scenario as input and first runs the allocation profiler 104 against the API under test 102 using the script. The coordination module then repeatedly reruns the scenario under the timing profiler 106 using the information about which methods were run in the allocation phase. The coordination module also guarantees that the timing profiler 106 is never instructed to measure timing of functions that are interdependent in the same run. Stated another way, the coordination module ensures that at most one measurement is in process on any thread of execution by not simultaneously measuring any two functions which might appear on the same call stack. Thus, no secondary functions are measured and recorded that might mask the real performance of the API under test 102. In one aspect of the invention, functions that never appear on the same call stack may be measured and recorded concurrently. For example, given three functions A, B, C, if only functions A and C ever appear on the same call stack, then A and C cannot be measured and recorded concurrently. But, functions A and B can be recorded concurrently as can functions B and C.

A merging tool module 110 combines the results from all runs of the memory allocation profiler 104 and the timing profiler 106 into a single results table 112 for each API under test 102. The results table for the particular API under test 102 can show the log base 2 bucketing of the inclusive and exclusive memory allocation as well as the log base 2 bucketing of the execution time. The merging tool module can also be used to combine results from several different runs to generate a table that is representative of a broad range of usage for the API under test 102. Thus, single exercise statistics as well as multiple call statistics may be gathered on the API under test 102.

A graphical user interface 114 for rendering the results table 112 data of any API under test 102 into histograms for each function allows the developer to make inferences about the performance characteristics of the functions that make up the given API under test 102. In one embodiment, the gathered API performance information in the results table 112 for the specific API under test 102 may be organized or bucketed by orders of magnitude using a log base 2 method. Additionally, API performance profiles may be created by analyzing the data.

These performance profiles communicate useful information both to API owners as well as API consumers. A profile might indicate, for example, that there is a start-up cost to begin using an API, after which subsequent calls entail no memory consumption. Another profile might indicate that both memory allocation and time-to-execute increases in a linear or other relationship to data that is provided to the API call. These profiles can be analyzed and categorized in order to ensure API product quality for API developers or to develop new APIs that should meet certain desired performance characteristics.

As a non-limiting example, performance-sensitive code such as the API Object. Equals or GetHashCode( ) override can be characterized and profiled using aspects of the invention. Users of these APIs, such as developers, can exercise good design practice by accessing the published profile information to predict the performance that the profiled APIs will have on their design.

In some embodiments, the software architecture modules of FIG. 1 may be provided to a computer for execution via a download from a network-connected computer or via computer readable media, such as, but not limited to, a CD-ROM. After download, the computer architecture or modules of FIG. 1 may reside in computer RAM awaiting execution.

Figure 2:
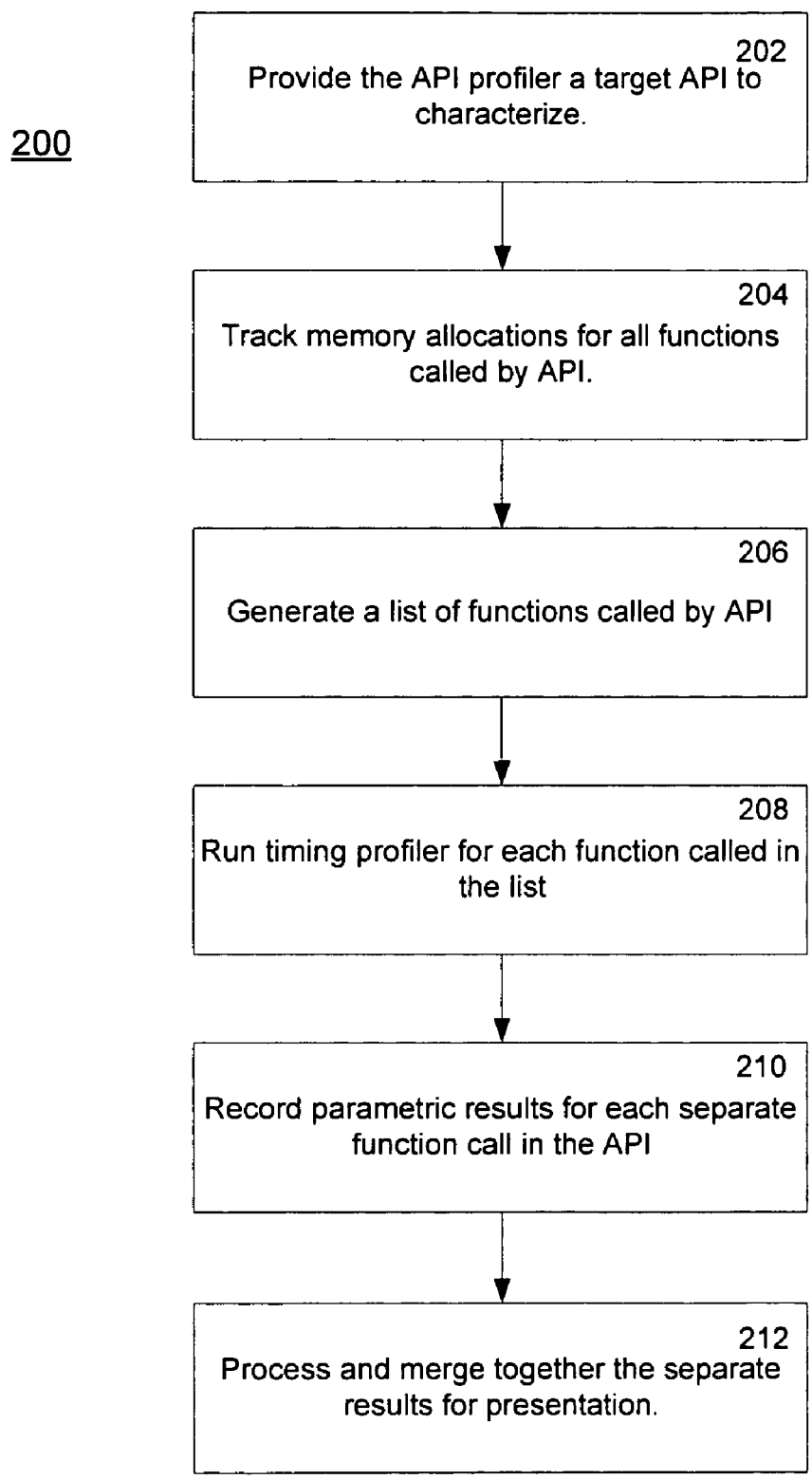
FIGS. 2 is an example flow diagram depicting an example method of measuring an API according to aspects of the invention.

In one aspect of the invention, The API profiler can use several passes over the same API exercise scenario to ensure that timing data is gathered with greater accuracy than can be achieved with a single pass. FIG. 2 is a flow diagram 200 showing an example method of the API profiler. Initially, the API profiler is given a target API to characterize (step 202). The memory allocation profiler is then run in a mode that tracks memory allocation for all functions called by the API (step 204). As a result, a list of all functions called by the API under test is generated (step 206).

Once this list has been acquired, the system then reruns the scenario once for each function in the list and measures the timing of each function in complete isolation of all other functions (step 208). For each function run, parametric timing and memory allocation data are collected by the API profiler and the results are recorded (step 210). This step has the effect of measuring only the overhead that is incurred for the individual function that is being tracked in a given run. The advantage being that there is no cumulative error introduced by functions deeper in the call tree.

In an alternate embodiment, this method may be generalized so that rather than merely gathering a list of functions in the allocation phase, the API profiler could also compute which functions can appear on the stack together and which functions cannot. Then, it becomes possible to measure more functions than one per run and still guarantee the same high degree of accuracy. The memory and allocation information from executing the API with the call stack group can then be merged into the results table for presentation. In one embodiment, presentation may be via histogram for each function or group of functions.

Once results from the individual runs is recorded, the separate results are processed for presentation (step 212). As part of this step, the API profiler may express the range of possible values for timing and memory allocation by keeping track of the log base 2 of the execution time or allocated bytes, depending on what is being measured in the current run, for each call to each of the functions. Each log base 2 entry is used to increment a count for the bucket of calls for which memory allocation or execution time had the same log base 2 value. The results from all of the separate runs are then merged together (step 212). The final result is a table of all functions in the scenario with the counts for each discrete log base 2 value for memory allocation and timing. It is also possible to merge the results from several scenarios to gain a more representative view of the functions in an API across a broad range of scenarios.

In one non-limiting embodiment, pseudo code for the API performance data collection method is as follows:

```
gather_statistics (scenario):
    allocation_table = measure_allocations(scenario)
    timing_table = new table [key = function, value = array of buckets]
    for each function in allocation_table:
        timing_table[function] = measure_timing(function, scenario)
    return [allocation_table, timing_table]
measure_allocations (scenario):
    allocation_table = new table
    [key = function, value = array of buckets]
    using the allocation profiler, launch scenario:
        for each memory allocation of n bytes:
            index = log_2(n)
            for each function on the call stack:
                bucket = allocation_table[function][index]
                increment bucket.count
                add n to bucket.sum
                add n^2 to bucket.sum_of_squares
    return allocation_table
measure_timing(function, scenario):
    buckets = new array of buckets
    using the timing profiler, launch scenario:
        for each call to function with duration of n cpu cycles:
            index = log_2(n)
            bucket = buckets[index]
            increment bucket.count
            add n to bucket.sum
            add n^2 to bucket.sum_of_squares
    return buckets
```

In the above pseudo code example, the parameters of timing and allocation may also be augmented such that measurements of disk I/O, network usage, or any other API-influenced parameter may be made as long as the parameter measured is not overly disturbed by the measurement process.

In the above example pseudo code, note that $\log_2(n)$ means the largest integer smaller than or equal to the log base 2 of n. Characterizing the data in buckets may also include placing the performance of APIs in buckets. Essentially, the measured parameters are rounded down using the log base 2 to the closest integer to yield the 'power of two buckets'. This can be implemented by finding the position of the most significant bit in the binary representation and placing the data in the proper bucket as a category of performance. Further, sums and sums of squares are bucketized so that basic statistics, such as average, mean, and standard deviation of measured API parameters may be calculated. Such statistics provide a user with relevant information concerning the performance of a measured API.

In a non-limiting example, assume the following program:

for i from 1 To 100:

for j from 1 To 3:

a(j)

b(j)

c(j)

Using the API data profiler, the whole program runs through the allocation profiler and sees the following call sequence 100 times:

A(1)—allocates 3 bytes $\log_2(3)=1$

B(1)—allocates 107 bytes $\log_2(107)=6$

C(1)—allocates 819 bytes $\log_2(819)=9$

A(2)—allocates 7 bytes $\log_2(4)=2$

B(2)—allocates 120 bytes $\log_2(120)=6$

C(2)—allocates 1560 bytes $\log_2(1560)=10$

A(3)—allocates 22 bytes $\log_2(22)=4$

B(3)—allocates 115 bytes $\log_2(115)=6$

C(3)—allocates 1800 bytes $\log_2(1800)=10$

During which, the following bucketized data is gathered as in Table 1. For clarity, only the count of allocations for functions A, B, and C are shown in Table 1. The bucketized computations of sums and sums of squares for these functions can be computed in a likewise fashion.

TABLE 1

| | Log base 2 of bytes allocated | | | | | | | | | |
|---|---|---|---|---|---|---|---|---|---|---|
| Function | Bucket 1 | Bucket 2 | Bucket 3 | Bucket 4 | Bucket 5 | Bucket 6 | Bucket 7 | Bucket 8 | Bucket 9 | Bucket 10 |
| A | 100 | 100 | 0 | 100 | 0 | 0 | 0 | 0 | 0 | 0 |
| B | 0 | 0 | 0 | 0 | 300 | 0 | 0 | 0 | 0 | 0 |
| C | 0 | 0 | 0 | 0 | 0 | 0 | 0 | 0 | 100 | 200 |

The buckets in Table 1 are expressed in log base 2 of bytes allocated and also note that only A, B, C are each invoked by the scenario, so the program can be rerun 3 times; once for each function using the timing profiler. On the first run, only function A is run. Notice that over the course of 300 calls to A, it is observed that it takes between 20 to 40 clock cycles to execute, and taking the log 2 and incrementing the buckets each time we get the following for function A in Table 2:

TABLE 2

| | Log base 2 of CPU cycles | | | | | | | | | |
|---|---|---|---|---|---|---|---|---|---|---|
| Function | Bucket 1 | Bucket 2 | Bucket 3 | Bucket 4 | Bucket 5 | Bucket 6 | Bucket 7 | Bucket 8 | Bucket 9 | Bucket 10 |
| A | 0 | 0 | 0 | 191 | 109 | 0 | 0 | 0 | 0 | 0 |

The buckets in Table 2 are expressed in log base 2 of CPU cycles. On the next two runs, B and C are exclusively run. Then, a merge of the 3 runs may occur. This process may be run over many scenarios in a lab, development environment, or a runtime user environment and all of the data collected may be merged together by simply adding the bucket counts for common functions. This represents one way to build an API profile from a fixed set of scenarios running in a lab, developing environment, or a runtime user environment. The user interface 114 of FIG. 1 may then be employed to render the bucketized data for examination.

The bucketized data is preferably published such that designers may access the measured and recorded API data. For example, the collected API data may be collected in a central location, such as a central database, having remote access. Alternately, the API data may be produced in computer-readable media or paper catalog form and distributed to users. Any commonly known publication and dissemination scheme may be employed for publication.

In another aspect of the invention, the visualization of the summarized data at the user interface is accomplished such that the results are easy to comprehend. For example, the results of the collected and aggregated API measurement data may be depicted as a histogram summarizing the counts in each bucket. Alternatively, the results may be depicted using a color spectrum with color segments towards the hot end corresponding to the more costly buckets and the cheaper end in cooler colors. The intensity of the color or thickness of the bar corresponds to the number of samples in that bucket.

Distributed Collection of API Data

In one aspect of the present invention, API data may be collected in a distributed manner. One objective in distributed API data collection is to create a database of API performance to assist developers and users in assessing the cost of using any one API. It is desirable to gather a statistically interesting sample of actual measurements of API performance "in the wild" to populate the database. The populated database has more value if the performance parameters reflected typical "performance costs" as observed in actual typical applications on typical hardware. Thus, the performance of APIs in actual use on user machines is desirable. This data gathering process can then be used to produce a characteristic distribution of performance cost for various different "resource costs" such as execution time, memory allocations, and disk I/O.

To minimize the performance cost or overhead associated with measuring API performance on a user machine, it is desirable that only a small number of APIs be measured in any given run and that these APIs be chosen at random from run to run. Typically, only one API may be measured at a time. In one embodiment, API data gathering can be done on a variety of systems on a voluntary user opt-in basis. This will create a random sample of APIs gathered on a variety of hardware over time. The data can be periodically updated to central servers where the database of API performance is augmented with the additional anonymous data.

Figure 3:
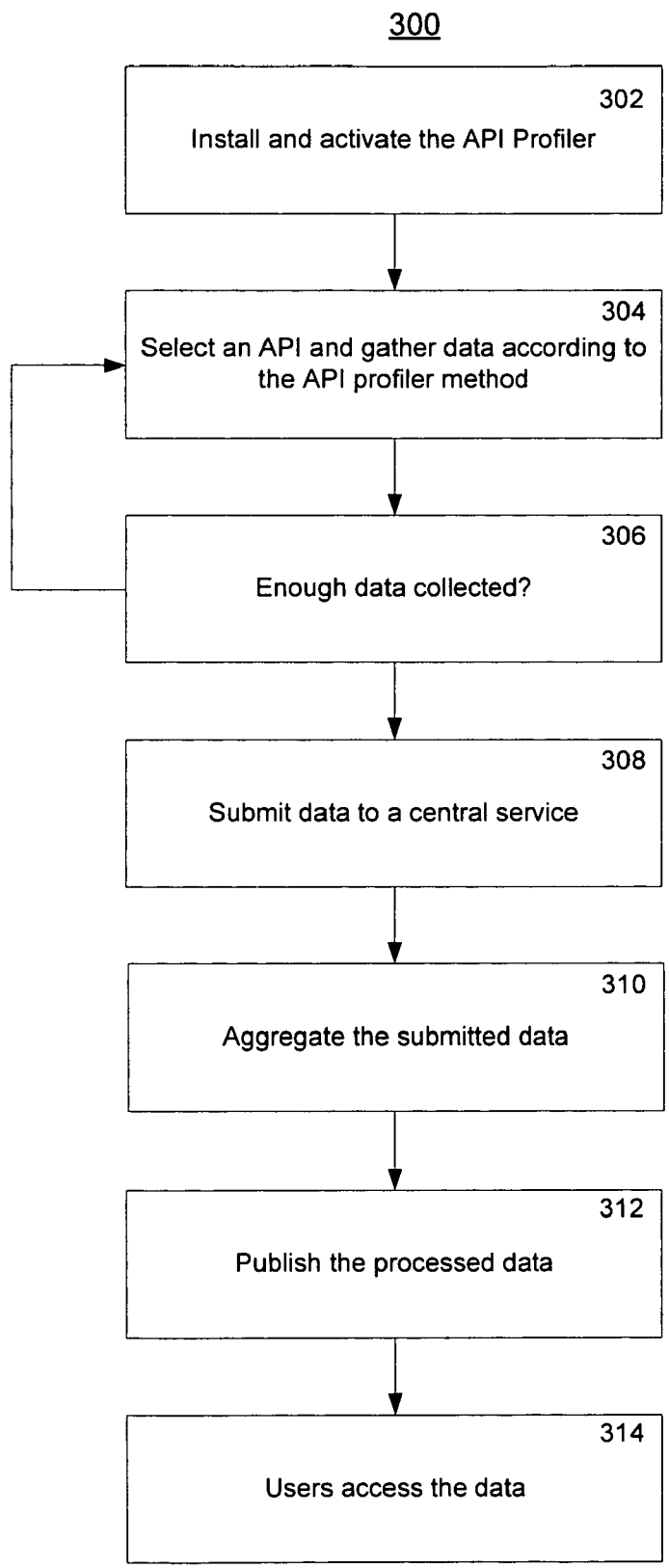
FIG. 3 is an example flow diagram depicting an example method of a distributed API measurement scheme according to aspects of the invention.

FIG. 3 is a flow diagram of a method 300 which may be used to collect distributed data from APIs running on users' computing equipment. In order for a user to participate in the data gathering he/she must first install a suitable profiler system program or set of modules which will facilitate the gathering and submission of the API data. It is assumed that the user is asked and agrees or opts-in to the process of collection. In one embodiment, many users opt-in to the collection scheme and the data provided is from a diverse set if users, application, and machines resulting in a collection of a broad spectrum of API data. Initially, the user would download or otherwise install and configure the API profiler (step 302) software modules to enable the measure of APIs on a non-interference basis. The necessary executables may be downloaded from the internet and installed locally or may be acquired via CD-ROM or equivalent program data storage media. Additionally, the API profiler may then be serviced as is normal for software delivered from the internet. Step 302 need only be performed once and all subsequent data gathering sessions can start at step 304.

To actually gather data, the data collection system must activate itself whenever the user runs any executable program. At this time, the API profiler data collection system chooses an API to monitor at random and collects the data (step 304). Calls to the selected API are then intercepted and the cost is measured in one or more dimensions such as time, disk operations, network, memory, etc.

In one embodiment, the random selection of an API may be made using techniques known to those of skill in the art. The specific random selection technique used may be dependent on the particular runtime environment upon which the API profiler collection software is embodied. For example, on the .NET™ Common Language Runtime (CLR™), an adjustment to the Just-In-Time (JIT) compiler may be made to generate a random number every time a method is JIT-compiled. If the random number is smaller than a fixed threshold, then the JIT compiler may instrument the method such that calls to the method are then intercepted and measured by the API profiler. Many such randomized selection techniques may be implemented for API selection in a given circumstance. One of skill in the art could choose the appropriate random selection approach based on the specific technology they choose to target with the invention.

The interception techniques of a function call to the selected API are also well known to those of skill in the art and are numerous. Similar interceptions already happen to provide special behavior for application compatibility, also known as "app compat shims" in new operating systems. This same system can be used to inject measurement hooks. The actual measurements are again taken using well known techniques already used by existing profiling systems.

It is noted that the performance cost of data gathering is preferably minimized and there are several techniques which are employed to do so. In one example, the collection system may decline to collect any data based on system load or other configuration parameters so as to minimize the impact on the users system. One example is a system that prevents more than a fixed small number of programs from being instrumented simultaneously. For example, a data collection of no more than 6 binaries may be one setting. This number can by dynamically tuned by further downloads.

After a selected API has been measured, then at the end of each program run, the summarized gathered data may be written to disk for later submission. The amount of collected data may be determined and tested to determine if enough data has been selected (step 306). If enough data has been collected the data may be submitted, via transmission across a network, for example, to a central service (step 308). For example, when the recorded data reaches a suitable size (~128 k) to allow for a reasonable batch of data with a modest upload time to be delivered, a web service may be contacted and the users' summarized API performance information is uploaded to the central service. Alternately, if more API collection data may be collected locally, then the process can then move back to step 304 where a next API is randomly selected.

The central service may then respond to the upload request by adding the new counts and costs in each category to each API for which a given user provided information. This is known as aggregation (step 310) where new API performance data is add to the central service results database. The results database is thus always updated with fresh information. In one embodiment, the use of additive statistics is employed to avoid batch processing. In one embodiment, it is preferred to not track information such as "average unique APIs called by a users" as this would require time consuming reprocessing of existing data whenever a new batch of results was added.

In one aspect of the invention, the central database can be published to users via a number of vehicles (step 312). For example, the database may be accessed remotely via the internet or other network connection. Periodic refresh of the entire database is preferable so that users can have the most up to date performance cost information. Not all users need be updated simultaneously and the entire database of results need not be delivered. In one embodiment, the user can simply query small pieces of the results database of the central service on a daily basis and they will rotate through the data incrementally refreshing their content. Optionally the entire results database can be made available for download should a user wish to do so. In addition to direct publication of the database in a binary format, the contents can be used in a variety of ways directly and indirectly as indicated below.

In one aspect of the invention, users are consumers of the collected API performance data (step 314). Users may access the data for many purposes and in a variety of ways. Examples of useful modes of use are outlines below demonstrating the utility of the API profiler system.

1) The standard API references automatically include the information contained in the API profiler results database for display both graphically and with "drill-down" available to view the details in numeric form.
   a. A documentation formatting system creates a document for each API.
   b. For each API, as it is created, the API profiler data is consulted to obtain the API performance cost summary.
   c. The performance cost summary is inserted into the document in graphical form along with a link that will allow "drill-down" to the latest data in detailed form on the web -based publication of the collected API performance data.
2) The design-time coding assistants such as the Intellisense™ feature of the Microsoft® Visual Studio™ system can include the cost summary in graphical form with optional drilldown as new API calls are being coded so that the typical costs are immediately visible.
   a. The system creates a set of possible API completions.
   b. For each completion, the system consults the collected API profiler data.
   c. Each of the system displays presents the summary from API profiler collected information in graphical form.
3) The diagnostic portions of a code profiling system consults the API profiler collected data to see if any given user's usage of an API has costs comparable to typical usage patterns. Abnormal costs may be reported to the user as suspicious to enhance their troubleshooting experience.
   a. For each observed API in the profile, the system consults the API profiler results.
   b. For each API, the observed distribution of costs is compared against the API profiler results distribution using a standard statistical method such as the "permutation test".
   c. If the statistical method suggests that there is statistical evidence that the users cost distribution is worse than the API profiler collected data distribution then the API in question is flagged as a potential improvement point and presented to the user for investigation.
      i. The presentation can be by highlighting the API when it appears in callstacks, or
      ii. By creating a list of such APIs, or
      iii. By highlighting those contexts in which the API had the highest observed costs.
4) API Vendors may employ these techniques to create an internal survey of their customers' typical usage and costs and thereby target API improvements and track their success.
   a. Distributions of costs can be generated broken down by originating module, namespace, or both, in report format.
   b. These break-downs are then consumed by the organization for planning purposes.

In one aspect of the invention, as mentioned above, the API profiler preferably operates such that a low performance impact is impressed upon the user system being measured. Given that any particular measured API could be called millions of times in the course of a single program execution, and potentially even more with hardware improvements, it is important that the API cost be kept in an economical form that is amenable to further analysis. It is desirable to have a fixed size entry for each API under measurement in a given session. Yet, it is also desirable to capture a cost distribution that has a large variation. To achieve this, one approach is to not capture the exact cost but rather track counts of costs in assorted "buckets."

As described above, buckets are created for each increasing power of two of performance or resource cost. That is one bucket for costs greater than or equal to 1, 2, 4, 8, etc. In each cost bucket, the usual statistical accumulation is tracked to facilitate incrementally computing the mean and variance. That is, the count of samples, the sum of the costs, and the sum of the square of the costs are computed. These values can be held in various precisions. For example, a 64 bit integer for the counts and one double precision floating point number for each of the other two statistics is used. Additionally the total count, total sum, and total sum of squares for all samples are maintained so that an overall average and variance can be provided. This approach limits the cost of the aggregated data while still preserving the necessary distribution information. Furthermore all of these data are additive so they can be readily combined with samples from different runs or different computers by simple addition.

In one embodiment, the measured times are preferably maintained in the standard units of the available high resolution timers, such as in cycle counts., This saves computation time and results in the highest quality times being persisted to disk.

As an aspect of the invention, a computer-readable medium, such as, but not limited to, magnetic storage devices, optical devices, such as CD and DVD media may be used to store computer program instructions which can implement methods discussed or suggested herein. Such computer media are envisioned to retain executable instructions for use on a general purpose computer to enable it to practice aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 4:
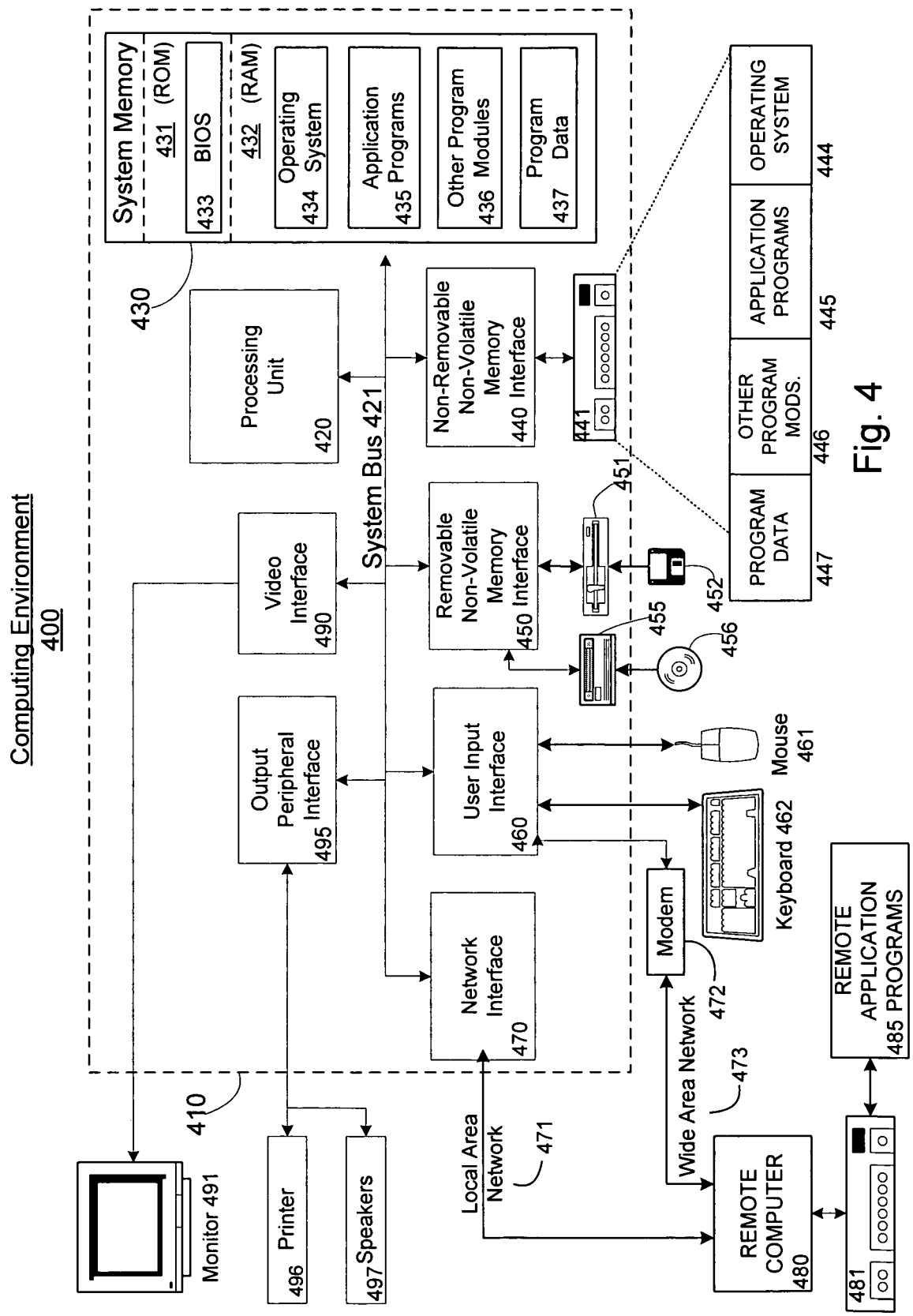
FIG. 4 is a block diagram showing an example host computing environment.

FIG. 4 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for collecting and reporting API performance profiles. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to measure performance of an Application Programming Interfaces (APIs), the method comprising:
    (a) creating a list of APIs to measure;
    (b) selecting a single target Application Programming Interface (API) from the list;
    (c) intercepting by one or more computer processors calls to the target API and collecting timing and memory allocation data;
    (d) recording by the one or more computer processors the timing and memory allocation data for the target API, the recorded data placed into storage;
    (e) merging by the one or more computer processors measured results into a results table having bucketized data indicating log base 2 of the collected timing and memory allocation data; and
    (f) repeating steps (b) through (e) for each API on the list.

2. The method of claim 1, further comprising:
    generating a database of results and making the database available to users of API performance data.

3. The method of claim 1, further comprising:
    presenting the results table via a graphical user interface using histograms for each function.

4. The method of claim 1, further comprising:
    generating a list of functions called by the target API, the list comprising non-interfering functions comprising functions that never appear on the call stack at the same time;
    concurrently measuring timing and memory allocation for a plurality of non-interfering functions.

5. The method of claim 4, further comprising:
    merging measured results of execution of the non-interfering functions into the results table having bucketized data indicating a log base 2 of the timing and memory allocation data.

6. The method of claim 5, further comprising:
    presenting the results table via a graphical user interface using histograms for each function.

7. The method of claim 1, wherein a program to measure performance of an API resides on a plurality of user computers, the method further comprising:
    testing to see if the recorded data in storage exceeds a threshold amount;
    selecting another API in a user computer on which to measure memory allocation and timing data if the threshold amount is not exceeded, and repeating steps (b) through (e);

submitting the recorded data in storage to a central service location if the recorded data in storage exceeds the threshold amount, the central service location having API measurement data in storage;

aggregating the submitted data with the API measurement data in storage at the central storage location; and generating a database of results and making the database available to users of API performance data.

8. The method of claim 1, wherein selecting an API on which to measure memory allocation and timing data comprises using a random number generator to select a target API.

9. A computer system for acquiring performance data for Application Programming Interfaces (APIs), the system comprising:

a processor executing software instructions, the software instructions comprising:

a memory allocation profiler module which measures and records a number of times a function is called by a target Application Programming Interface (API) producing memory allocation measurements of the target API;

a timing profiler module which measures and records timing information related to the target API producing timing measurements of the target API;

a coordination module that runs the memory allocation module and the timing profiler module once for each invocation of the target API, wherein the coordination module avoids simultaneously measuring any two APIs which appear on the same call stack;

a merging tool module which combines the memory allocation measurements and the timing measurements of the target API into a results table; and a user interface module which can display data of the results table in a form according to a log base 2 bucketing of the memory allocation and timing measurements.

10. The computer system of claim 9, wherein the memory allocation profiler separately measures and records inclusive and exclusive memory allocation values.

11. The computer system of claim 9, wherein the user interface module further comprises a graphical user interface that renders data of the results table into histogram form for each function call measured.

12. A computer-readable storage medium having computer-executable instructions for performing a method of acquiring performance data for Application Programming Interfaces (APIs), the method comprising:

(a) creating a list of APIs to measure;

(b) selecting a single target API from the list;

(c) intercepting calls to the target API and collecting timing and memory allocation data;

(d) recording the timing and memory allocation data for the target API, the recorded data placed into storage;

(e) merging measured results into a results table having bucketized data indicating a log base 2 of the collected timing and memory allocation data; and (f) repeating steps (b) through (e) for each API on the list.

13. The computer-readable storage medium of claim 12, further comprising:

generating a database of results and making the database available to users of API performance data.

14. The computer-readable storage medium of claim 12, further comprising:

presenting the results table via a graphical user interface using histograms for each function.

15. The computer-readable storage medium of claim 12, further comprising:

generating a list of functions called by the target API, the list comprising non-interfering functions comprising functions that never appear on the call stack at the same time;

concurrently measuring timing and memory allocation for a plurality of non-interfering functions.

16. The computer-readable storage medium of claim 15, further comprising:

merging measured results of execution of the non-interfering functions into the results table having bucketized data indicating a log base 2 of the timing and memory allocation data.

17. The computer-readable storage medium of claim 16, further comprising:

presenting the results table via a graphical user interface using histograms for each function.

18. The computer-readable storage medium of claim 12, further comprising:

testing to see if the recorded data in storage exceeds a threshold amount;

selecting another API on which to measure memory allocation and timing data if the threshold amount is not exceeded, and repeating steps (b) through (e);

submitting the recorded data in storage to a central service location if the recorded data in storage exceeds the threshold amount, the central service location having API measurement data in storage;

aggregating the submitted data with the API measurement data in storage at the central storage location; and generating a database of results and making the database available to users of API performance data.

19. The computer-readable storage medium of claim 12, wherein selecting an API on which to measure memory allocation and timing data comprises using a random number generator to select a target API.

* * * * *